United States Patent [19]

Altnau

[11] 4,289,320
[45] Sep. 15, 1981

[54] FACE SEAL FOR WASHER TUB AND WATER PUMP

[75] Inventor: Ronald L. Altnau, Ripon, Wis.

[73] Assignee: Speed Queen Company, Ripon, Wis.

[21] Appl. No.: 114,271

[22] Filed: Jan. 22, 1980

[51] Int. Cl.$^3$ .............................................. F16J 15/34
[52] U.S. Cl. ...................................... 277/67; 277/69; 277/88; 277/133; 277/14 V; 308/187.1
[58] Field of Search .................. 277/12, 14 V, 16, 24, 277/38–43, 67–69, 81 R, 77, 88–90, 133, 134; 308/36.1, 187.1, 187.2

[56] References Cited

U.S. PATENT DOCUMENTS

| | | | |
|---|---|---|---|
| 2,003,003 | 5/1935 | Marbury | 277/68 X |
| 2,167,986 | 8/1939 | Lignian et al. | 277/89 X |
| 2,583,671 | 1/1952 | Schmitter | 277/67 X |
| 2,667,776 | 2/1954 | Kortepeter et al. | 277/41 X |
| 2,766,943 | 10/1956 | Lockley et al. | 277/133 X |
| 2,901,294 | 8/1959 | Smith | 277/43 X |
| 2,992,843 | 7/1961 | Smith | 277/88 |
| 4,095,808 | 6/1978 | Glasson | 277/81 R |
| 4,130,287 | 12/1978 | Ritzie | 277/12 |

FOREIGN PATENT DOCUMENTS

| | | |
|---|---|---|
| 574619 | 1/1946 | United Kingdom . |
| 836136 | 6/1960 | United Kingdom . |

*Primary Examiner*—Robert S. Ward, Jr.
*Attorney, Agent, or Firm*—Robert W. Hoke, II

[57] ABSTRACT

A face seal assembly mounted on a vertically oriented drive shaft is disclosed for use in connecting two members rotatable with respect to each other. The seal assembly includes a lower stationary graphite seal member which is received in one end of a rubber bellows. A spring within the bellows urges the upper surface of the graphite ring into contact with an upper rotatable second seal member, which is preferably a bronze mating ring. Liquid which seeps radially inwardly past the seal members is channeled within the rubber bellows to discharge outside the face seal assembly without contacting either the drive shaft, or the bearing member located below the bellows. The channel means includes a collar portion within the bellows extending downwardly along the drive shaft from a point adjacent the seal members. A bottom wall, contiguous with the collar encloses the bottom end of the bellows and provides support for the spring located within the bellows. The bottom wall defines apertures which communicate with the channels in the support structure located immediately below the bellows assembly to provide a path for accumulated seepage which is directed radially outwardly of the outer bearing surfaces.

1 Claim, 6 Drawing Figures

FACE SEAL FOR WASHER TUB AND WATER PUMP

BACKGROUND OF THE INVENTION

This invention relates generally to face seals, and in particular to face seal assemblies which divert liquid seepage away from bearing elements located adjacent the face seal members.

Prior art face seals of the kind having a stationary seal element and a rotatable seal element of widely used where a leak-proof connection of rotating components is required. While generally acceptable in their performance, these seal arrangements are known to seep a relatively small amount of liquid past the seal surfaces. Frequently these seals are located near bearing elements, which provide rotating support for the components to be sealed. If not controlled, the seepage can flush out, or otherwise contaminate the bearing lubricant, causing premature failure of the bearing element.

Some prior art approaches to controlling seepage such as found in U.S. Pat. No. 3,751,046—Golubev et at and U.S. Pat. No. 3,895,811—Richards, Jr. et al, have included arrangements for diverting seepage away from bearing elements, but these arrangements are complex and appear difficult to fabricate.

SUMMARY OF THE INVENTION

Accordingly, it is an object of this invention to provide a new and improved face seal assembly, including relatively simple, but effective means for channeling or diverting seepage away from the seal elements and bearing members located adjacent thereto.

It is a further object of this invention to provide a face seal assembly of the above-described type which is economical to manufacture, comparatively easy to assemble and install, and comprised of a minimum number of relatively inexpensive parts.

Briefly, a preferred embodiment of a face seal assembly according to the invention comprises an upper bronze seal ring disposed within a retainer member which is axially fixed to the outside of a rotating drive shaft of a washer tub, washer pump, or the like members comprising a clothes washing apparatus. A lower stationary retainer member, positioned about the lower end of the drive shaft, is provided with a radially inner collar or rim rising upwardly therefrom. A base wall, contiguous with the lower portion of the collar extends in a radially outward direction. A rubber bellows engages, at its lower portions, the outside of the base wall. It includes, at its upper portion, a receptacle for retaining a graphite seal ring interposed between the rubber bellows and the upper rotatable bronze seal ring. A conical-shaped coil spring, disposed within the bellows, urges the upper bellows portion, and hence the graphite seal ring, into engagement with the bronze seal ring.

The inner collar of the lower retainer member is located at the innermost portion of the face seal assembly, and rises axially along the shaft adjacent to the point where the graphite and bronze rings engage, so as to prevent water seeping inwardly therebetween from contacting the drive shaft, and hence the bearing. The seepage is then directed down the inner collar and along the base wall of the retainer member. The base wall of the retainer member defines a plurality of holes allowing drainage of the accumulated liquid past bearings located beneath the face seal assembly.

Other objects and further details of that which is believed to be novel in the invention will be clear from the following description and claims taken with the accompanying drawings which illustrate two exemplary embodiments of the subject invention.

DESCRIPTION OF THE PREFERRED EMBODIMENT

Figure 1:
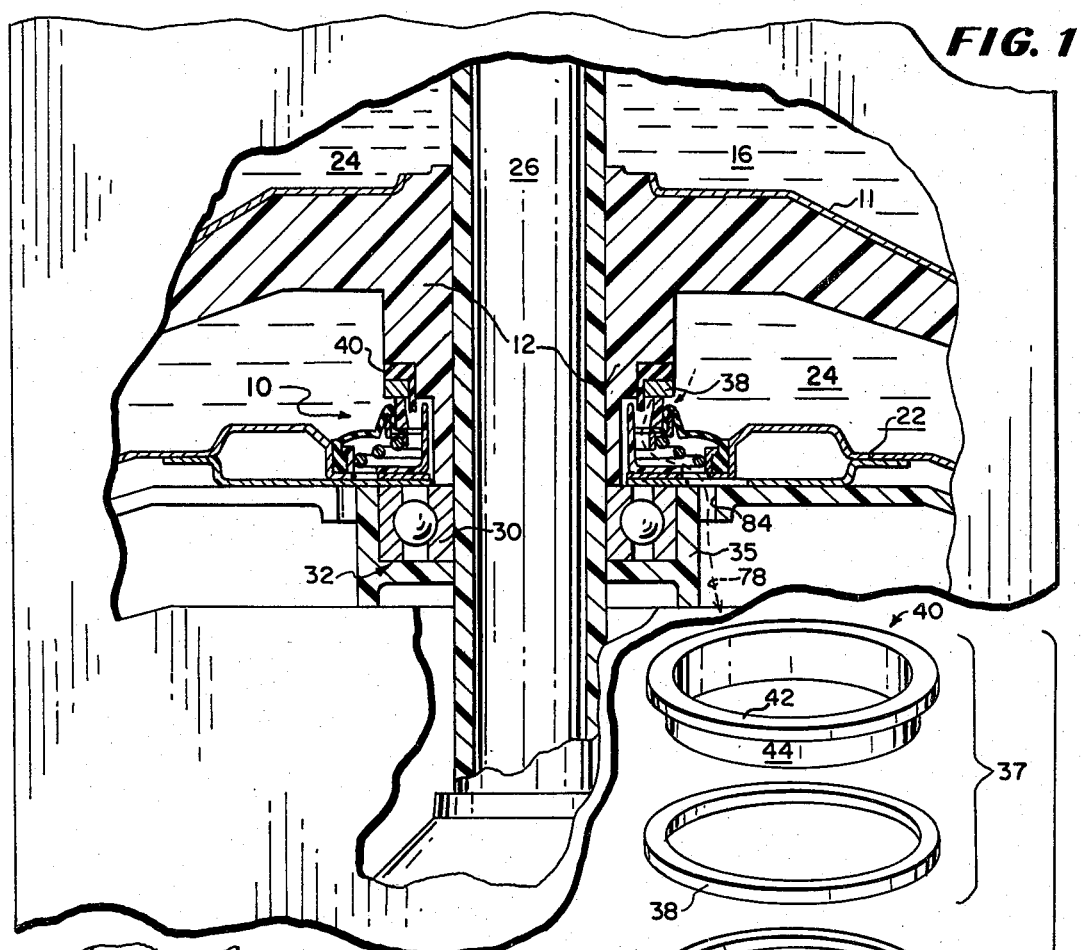
FIG. 1 is a side sectional view of a washer tub including a first embodiment of the face seal assembly constructed according to the present invention.
Figure 2:
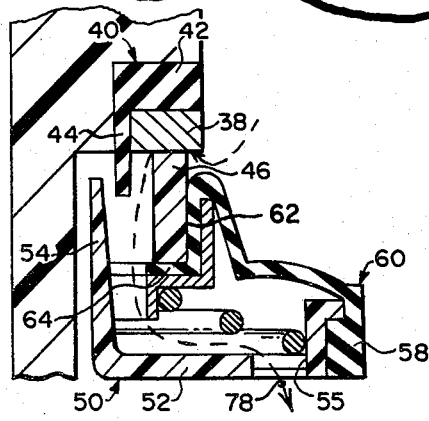
FIG. 2 is a partially broken away, enlarged sectional view of the right hand side of the face seal assembly of FIG. 1.
Figure 3:
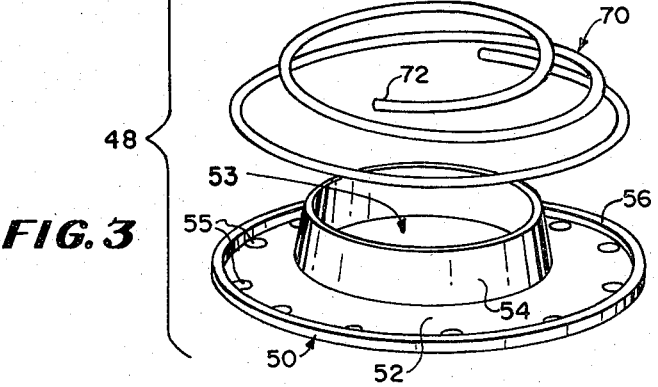
FIG. 3 is an exploded perspective view of the face seal assembly of FIGS. 1 and 2.
Figure 4:
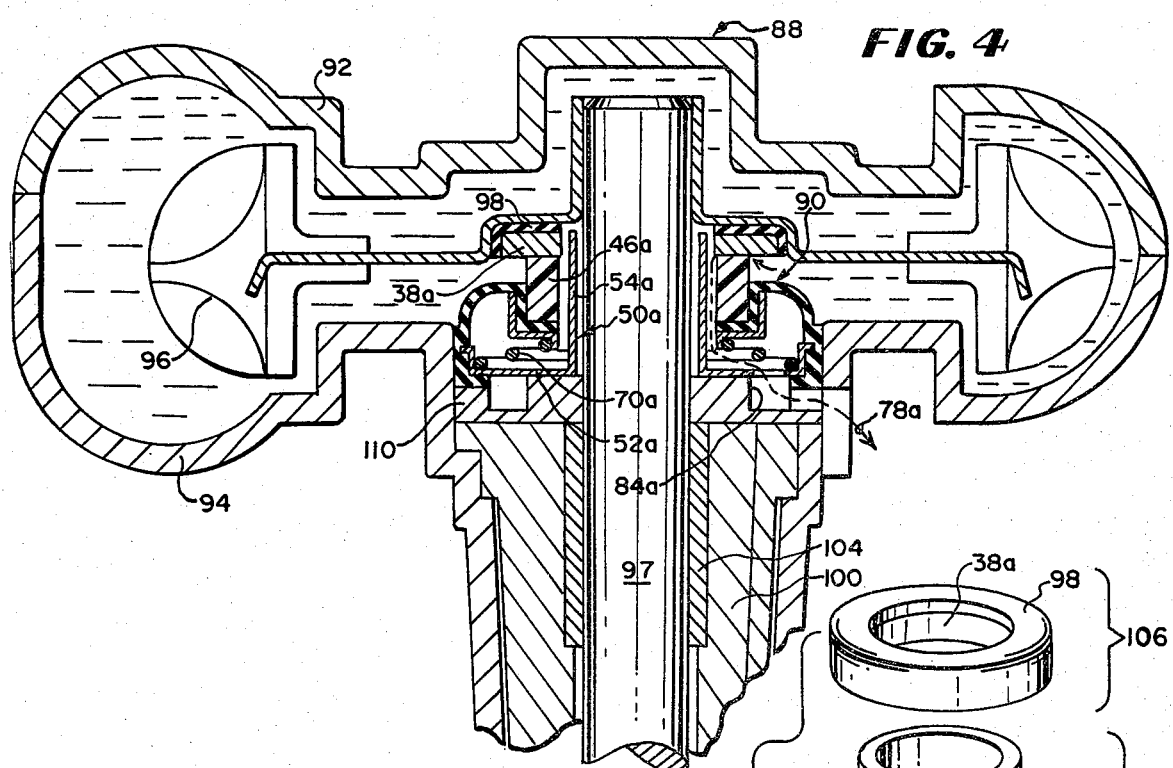
FIG. 4 is a side sectional view of a water pump containing a second embodiment of the face seal assembly according to the present invention.
Figure 5:
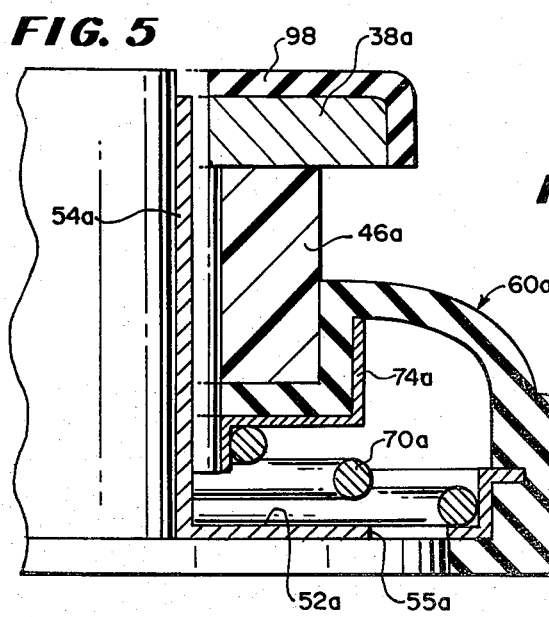
FIG. 5 is a partially broken away enlarged sectional view of the face seal assembly of FIG. 4.
Figure 6:
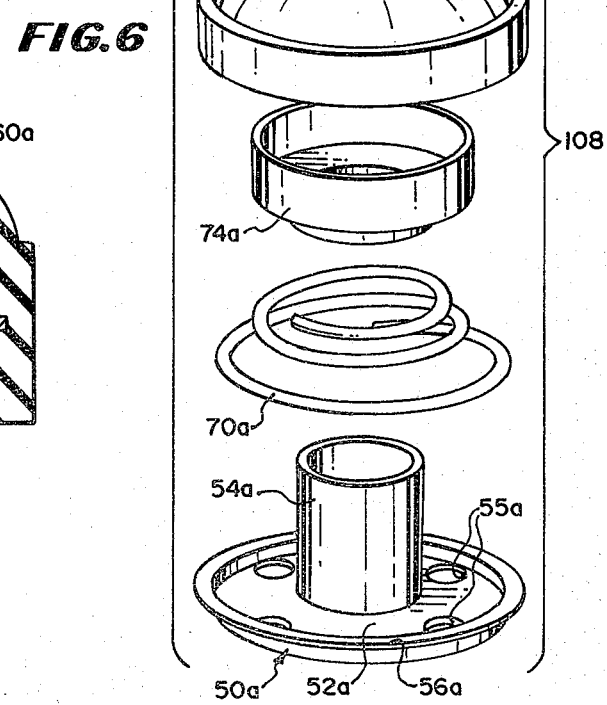
FIG. 6 is an exploded perspective view of the face seal assembly of FIGS. 4 and 5.

Referring generally to the drawings, two embodiments of the face seal assembly according to the present invention are shown. FIGS. 1-3 illustrate a first embodiment of the face seal assembly installed in the washer tub of a clothes washing machine. FIGS. 4-6 show a second embodiment of the face seal assembly of the invention installed in a water pump.

Turning now to FIG. 1, the first embodiment 10 of the face seal assembly according to the invention is shown installed in the bottom of an inner, perforated wash tub 11 mounted on a rotatable support member 12. The inner tub 11 is installed within a stationary solid-walled outer tub 22 filled with a liquid medium 24. The inner tub 11 and the support member 12 are coupled to a drive shaft 26 for rotation therewith. The tub 11 is supported on the radially inner portion 30 of a ball bearing assembly 32 by the support member 12. Ball bearing assembly 32 is pressed into a support plate 35 to which the outer tub 22 is attached.

The face seal assembly 10 as shown in FIGS. 1-3 includes an upper portion 37 having a first seal member or ring 38 which is inserted into a mating rubber collar 40 comprising a ring 42 and rim 44 extending downwardly therefrom at the inside edge thereof. Ring 38 rotatably engages a second seal member or ring 46. It is preferred that seal rings 38 and 46 be formed of sintered bronze and graphite, respectively, but any suitable materials may be substituted therefore.

The lower portion 48 of the face seal assembly 10 includes a retainer member 50 comprising a base or radially extending wall portion 52 having a central opening 53, and a cylindrical side wall 54 rising from the inside edge thereof. Base wall portion 52 also defines a plurality of apertures 55 therein, the purpose of which will be discussed hereinafter. An outer rim 56 rises from the periphery of wall portion 52 and is engaged by the lower lip portion 58 of a resilient bellows 60, fabricated of rubber or similar material. Bellows 60 includes a collar portion 62 having a shoulder 64 projecting radially inwardly from its free end. As is seen most clearly in FIG. 2, collar portion 62 and shoulder 64 formed, in cross-section, an "L" shaped receptacle or seat into which ring 46 is inserted. Conical spring 70 is supported by the base portion 52 of retainer member 50 and has a free end 72 received in a ferrule 74. Ferrule 74 engages shoulder 64 and collar portion 62 of bellows 60 to impart the upward bias spring 70 to seal ring 46, thereby maintaining ring 46 in face-to-face engagement with ring 38 (FIG. 2). The upper portion 37 of the face seal assembly 10 rotates with drive shaft 26 during washer operation, whereas the lower portion 48 of the face seal assembly 10 remains stationary. The frictional engagement of stationary seal ring 46 and bellows 60 prevents rotation of ring 46 during washer operation. The mounting of ring 46 in bellows 60 also allows ring 46 to follow any tilting of ring 38 with respect to a vertical direction, and is thereby free to follow the mating surface or face of rotating ring 38, preserving the sealed relationship therebetween.

Despite this resilient sealing engagement, seepage between the seal surfaces of rings 38 and 46 may occur. After prolonged operation of the washer device, it is possible that the liquid seepage, if allowed to come into contact with bearing assembly 32 located below the seal assembly, may cause the lubricant therein to be washed out or otherwise impaired, resulting in premature failure of the bearing assembly. To preserve the integrity of bearing assembly 32, the face seal assembly according to the invention provides a path, indicated by broken line 78 (FIGS. 1 and 2), for the liquid seeping past seal rings 38, 46. The seepage path is defined by downwardly depending rim 44 of collar 40, the radially adjacent, upwardly extending side wall 54 of retainer member 50, and base wall 52 of retainer member 50. It will be noted that side wall 54 of retainer member 50 overlaps with, and is located radially inwardly of rim 44, to form a continuous water deflection barrier to effectively prevent liquid seeping through rings 38 and 46 from contacting shaft 26, and hence flowing downwardly to bearing assembly 32. Base wall portion 52 of retainer member 50 acts to further channel the liquid seepage radially outwardly to apertures 55 located therein, which apertures communicate with an opening 84 in support plate 35. Accordingly, through the use of the face seal assembly according to the invention, liquid entering between the seal rings is diverted outside the face seal assembly, and away from bearing assembly 32.

Referring now to FIGS. 4-6, a water pump 88 of the type used in clothes washing machines and the like is shown. Incorporated in the water pump is a second embodiment 90 of the face seal assembly according to the invention. The water pump 88 comprises conventional housing members 92 and 94, and an impeller assembly 96 mounted on drive shaft 97. Shaft 97 is supported within stationary column 100 by sleeve bearing 104. Shaft 97, impeller assembly 96, bearing 104, and the housing 88 comprise a conventional pump.

FIGS. 4-6 show a second embodiment 90 of the face seal assembly according to the invention comprising upper and lower portions 106 and 108, respectively. In further describing the second embodiment 90 of the face seal assembly according to the invention, it should be noted that the elements thereof designated by the suffix "a", function in a similar manner to those components described with respect to the embodiment 10 of the face seal assembly of FIGS. 1-3. These elements include: seal rings 38a and 46a; resilient bellows 60a; conical spring 70a; ferrule 74a; and retainer member 50a.

Referring now to FIG. 5, the upper portion 106 of assembly 90 comprises ring seal 38a is retained by a resilient collar 98, the counterpart of collar 40 of the face seal assembly embodiment 10 of FIGS 1-3. While collar 98 performs a function similar to that of collar 40, collar 98 includes no downwardly depending rim, such as rim 44 of collar 40. Instead, the inner side wall 54a of lower retainer member 50a is dimensioned to overlie collar 98, and hence overlie seal ring 38a. Inner side wall 54a extends axially beyond the point where rings 38a and 46a meet in sealing engagement. In the second embodiment 90, any seepage that may flow between the seal surfaces of rings 38a and 46a follows the path indicated by broken line 78a, being deflected away from sleeve bearing 104 (FIG. 4). The seepage path is defined by inner side wall 54a of retainer member 50a, which overlie the junction of seal rings 38a and 46a to effectively prevent any liquid seeping through rings 38a and 46a from contacting the shaft 97 and, hence, flowing downwardly past support wall 110 to contaminate sleeve bearing 104. After passing along the outside of wall 54a, seepage is directed radially outwardly along wall 52a of retainer 50a, through apertures 55a and then through passageway 84a formed in support plate 110.

It can thus be seen that the face seal assembly according to the invention provides a means for simply and economically diverting any seepage that enters between face seal elements safely past bearing members located nearby. Other embodiments of the invention will be apparent to those skilled in the art, and it is intended to cover by the appended claims all embodiments falling within the scope thereof.

I claim:

1. A face seal assembly for use with liquid retaining apparatus including a stationary lower component and a rotatable upper component rotatably mounted above said lower component, a central drive shaft extending through said lower component, bearing means surrounding said drive shaft between said shaft and said lower component for accommodating rotation of the shaft relative to the stationary lower component, a support engaging said upper component with said shaft for rotation of the upper component therewith relative to said lower component, a first annular seal, a collar surrounding said drive shaft and receiving and mounting said seal on said support in surrounding relation to said drive shaft and upwardly spaced from said bearing mean, said collar including an annular ring defining upper and lower surfaces and inner and outer annular edges, a rim integral with and depending from said inner edge peripherally thereabout, said first seal seating against the lower surface of said annular ring and against said rim, said first seal presenting a downwardly directed seal surface, said rim depending below said seal surface and terminating in an annular lower edge, a second annular seal positioned below said first seal, said second seal including an upwardly directed seal surface engaged against the seal surface of said first seal in outwardly spaced relation to said rim and in spaced relation above the lower edge of said rim, a retainer member comprising an annular base overlying said bearing means and underlying said second seal in spaced relation therebelow, said base defining an inner annular edge and an outer annular edge, a peripheral wall integral with the inner edge of the base and projecting vertically therefrom radially inward of the depending rim, said peripheral wall terminating in an upper annular edge in spaced relation above the lower edge of the rim, said annular base extending radially outward of said bearing means, and liquid draining apertures defined through said base outward of said bearing means, a resilient bellows including a lower annular lip engaged with the outer annular edge of the annular base, said bellows including an upper annular collar portion defining an annular seat receiving said second seal, and a spring positioned within said bellows and engaged between said annular base and said second seal seating collar portion for resiliently biasing said second seal against said first seal.

* * * * *